United States Patent
Souiai et al.

(10) Patent No.: US 12,535,877 B2
(45) Date of Patent: Jan. 27, 2026

(54) BUNDLE ADJUSTMENT USING EPIPOLAR CONSTRAINTS

(71) Applicant: Magic Leap, Inc., Plantation, FL (US)

(72) Inventors: Mohamed Souiai, San Francisco, CA (US); Ankur Gupta, Union City, CA (US)

(73) Assignee: Magic Leap, Inc., Plantation, FL (US)

( * ) Notice: Subject to any disclaimer, the term of this patent is extended or adjusted under 35 U.S.C. 154(b) by 195 days.

(21) Appl. No.: 18/266,756

(22) PCT Filed: Dec. 3, 2021

(86) PCT No.: PCT/US2021/061805
§ 371 (c)(1),
(2) Date: Jun. 12, 2023

(87) PCT Pub. No.: WO2022/132464
PCT Pub. Date: Jun. 23, 2022

(65) Prior Publication Data
US 2024/0085977 A1    Mar. 14, 2024

Related U.S. Application Data

(60) Provisional application No. 63/125,137, filed on Dec. 14, 2020.

(51) Int. Cl.
*G06F 3/01* (2006.01)
*G01C 21/00* (2006.01)
(Continued)

(52) U.S. Cl.
CPC ......... *G06F 3/012* (2013.01); *G01C 21/1656* (2020.08); *G01C 21/3804* (2020.08);
(Continued)

(58) Field of Classification Search
None
See application file for complete search history.

(56) References Cited

U.S. PATENT DOCUMENTS 8,736,636 B2    5/2014  Kang
8,793,770 B2    7/2014  Lim
(Continued)

FOREIGN PATENT DOCUMENTS

JP    2020529065    10/2020

OTHER PUBLICATIONS

Title: Combining 2D to 2D and 3D to 2D Point Correspondences for Stereo Visual Odometery; Author: Manthe et al.; pp. 455-463; Publisher and vol. VISIGRAPP 2018-vol. 5: VISAPP; Source: https://www.scitepress.org/papers/2018/66236/66236.pdf (Year: 2018).*

(Continued)

*Primary Examiner* — Jwalant Amin
(74) *Attorney, Agent, or Firm* — Zi Y. Wong; Via LLP

(57) ABSTRACT

Methods, systems, and apparatus for performing bundling adjustment using epipolar constraints. A method includes receiving image data from a headset for a particular pose. The image data includes a first image from a first camera of the headset and a second image from a second camera of the headset. The method includes identifying at least one key point in a three-dimensional model of an environment at least partly represented in the first image and the second image and performing bundle adjustment. Bundle adjustment is performed by jointly optimizing a reprojection error for the at least one key point and an epipolar error for the at least one key point. Results of the bundle adjustment are used to perform at least one of (i) updating the three-dimensional model, (ii) determining a position of the headset at the particular pose, or (iii) determining extrinsic parameters of the first camera and second camera.

18 Claims, 5 Drawing Sheets

(51) Int. Cl.

| | | |
|---|---|---|
| *G01C 21/16* | (2006.01) | |
| *G02B 27/00* | (2006.01) | |
| *G02B 27/01* | (2006.01) | |
| *G06T 7/70* | (2017.01) | |
| *G06T 7/80* | (2017.01) | |
| *G01C 21/20* | (2006.01) | |
| *G06T 7/579* | (2017.01) | |

(52) U.S. Cl.
CPC ..... *G02B 27/0093* (2013.01); *G02B 27/0101* (2013.01); *G02B 27/0179* (2013.01); *G06F 3/011* (2013.01); *G06T 7/70* (2017.01); *G06T 7/85* (2017.01); *G01C 21/20* (2013.01); *G02B 2027/0138* (2013.01); *G02B 2027/0187* (2013.01); *G06T 7/579* (2017.01); *G06T 2207/10021* (2013.01); *G06T 2207/30244* (2013.01)

(56) References Cited

U.S. PATENT DOCUMENTS

| | | | |
|---|---|---|---|
| 8,823,855 | B2 | 9/2014 | Hwang |
| 8,874,673 | B2 | 10/2014 | Kim |
| 2018/0330521 | A1 | 11/2018 | Samples et al. |
| 2019/0026919 | A1 | 1/2019 | Aratani |
| 2019/0101758 | A1 | 4/2019 | Zhu et al. |

OTHER PUBLICATIONS

International Search Report and Written Opinion in International Appln. No. PCT/US2021/061805, mailed Feb. 18, 2022, 7 pages.
International Preliminary Report on Patentability received for PCT Patent Application No. PCT/US21/061805, mailed on Jun. 29, 2023, 6 pages.
Liu, X., et al., "Precise and robust binocular camera calibration based on multiple constraints", Applied Optics, vol. 57, No. 18, 2018, pp. 5130-5140.
Supplementary European Search Report and Search Opinion received for EP Application No. 21907460.6, mailed on May 6, 2024, 9 pages.
Weili, C., et al., "Optimization of position and pose estimation by using Epipolar line segmentation optimization BA algorithm", Proceedings of the 2019 4th International Conference on Robotics, Control and Automation, Jul. 26, 2019, pp. 21-26.
Kun Qian et al., "Visual SLAM With BoPLW Pairs Using Egocentric Stereo Camera for Wearable-Assisted Substation Inspect", IEEE Sensors Journal [online], (Oct. 14, 2019), vol. 20, No. 3, doi:10.1109/JSEN.2019.2947275, ISSN 0005660562, pp. 1630-1641, XP011767105.

\* cited by examiner

BUNDLE ADJUSTMENT USING EPIPOLAR CONSTRAINTS

This application is a National Stage Application of International Application No. PCT/US2021/061805, filed Dec. 3, 2021, which claims priority to U.S. Provisional Patent Application No. 63/125,137 filed on Dec. 14, 2020, which is incorporated by reference in its entirety.

TECHNICAL FIELD

This specification generally relates to image processing in extended reality systems, e.g., virtual, mixed, or augmented reality systems.

BACKGROUND

Augmented reality ("AR") and mixed reality ("MR") devices can include multiple sensors. Some examples of sensors cameras, accelerometers, gyroscopes, global positioning system receivers, and a magnetometer, e.g., a compass.

An AR device can receive data from multiple sensors and combine the data to determine an output for a user. For instance, an AR device can receive gyroscope and camera data from respective sensors and, using the received data, present content on a display. The AR device can generate an environment map using the sensor data, e.g., camera data, and use the environment map to present the content on the display.

SUMMARY

A computer vision system can use sensor data to generate an environment model of an environment in which a device, e.g., the computer vision system, is located, to estimate a position of the device within the environment, or both. For instance, the computer vision system can use data from multiple sensors to generate the environment model for the environment in which the device is located. The sensors can include depth sensors, cameras, inertial measurement units, or a combination of two or more of these.

An augmented reality headset can use a map, or a three-dimensional ("3D") model, of an environment, to provide 3D information that corresponds to a view of the environment. A computer vision system can use a simultaneous localization and mapping ("SLAM") process to both update the environment model and determine an estimated location of the device in the environment. The location of the device can include position data, orientation data, or both. As part of the SLAM process, the computer vision system can use bundle adjustment, a set-membership process, a statistical process, or another appropriate process. For instance, the computer vision system can determine, as part of the SLAM process, a location for a three-dimensional point in the environment model that represents an observable point in the environment. The observable point can represent a portion of an object in the environment. The computer vision system can then use bundle adjustment to refine the position of the three-dimensional point in the environment model, e.g., to make a more accurate prediction of the position of the observable point using additional data, updated data, or both.

Bundle adjustment is a process for using a set of images from different viewpoints to simultaneously refine a 3D model of environment, pose positions of the cameras that captured the images, and/or extrinsic parameters of the cameras. In bundle adjustment, errors are minimized between data for the cameras, such as reprojection error.

Bundle adjustment using epipolar constraints can be used to perform highly accurate online calibration of camera sensor extrinsics in any camera based SLAM system. Online calibration, when performed as part of bundle adjustment, can be susceptible to weighting schemes adopted for correction of extrinsics. An epipolar constraint can be used to estimate a probability of deformation as a cross product of rotation and translation between two cameras, or between one camera and a reference point. Thus, deformation error can be recovered in order to achieve greater accuracy, efficiency, or both, e.g., with a higher update rate.

Bundle adjustment using epipolar constraints can be used to more accurately estimate deformation between multiple camera sensors on a flexible device. Light and wearable augmented reality devices, e.g., headsets, can be prone to small but quick deformations over time. Applying epipolar constraints to bundle adjustment can address the problem of estimating that deformation in an efficient manner based on geometric constraints. The estimated deformation can be used to generate updated camera parameters, e.g., extrinsics. The updated camera parameters can be used in multi-camera triangulation-based SLAM systems.

The described systems can perform bundle adjustment using epipolar constraints, while an augmented reality system is in use by a user. For example, the bundle adjustment can be done for the system, e.g., an extended reality system, concurrent with the system capturing image data, generating extended reality output data, and displaying the output data on a headset or other display. Some extended, e.g., augmented, reality systems include or are provided as wearable devices, such as a headset, that cameras and other sensors are mounted on. As a result, these systems are often moved during use as the user walks, turns his head, or makes other movements. These movements often change the forces and stresses on the device, which can cause temporary and/or permanent deformations to the wearable device. Bundle adjustment can be performed automatically, as the system determines is necessary, while the augmented reality system is worn and in motion. This can result in improved performance for highly deformable systems which may experience a large amount of bending, rotation, and other movements.

Performing bundle adjustment using epipolar constraints can improve accuracy of camera calibration of an augmented reality headset. By applying epipolar constraints, the system can account for deformations between cameras as the cameras move from one pose to another pose. Thus, changes in relative position or relative rotation between cameras can be accounted for in the bundle adjustment.

In one general aspect, a method includes: receiving, from a headset, image data for a particular pose of the headset, the image data including (i) a first image from a first camera of the headset and (ii) a second image from a second camera of the headset; identifying at least one key point in a three-dimensional model of an environment at least partly represented in the first image and the second image; performing bundle adjustment using the first image and second image by jointly optimizing (i) a reprojection error for the at least one key point based on the first image and the second image and (ii) an epipolar error for the at least one key point based on the first image and the second image; and using results of the bundle adjustment to perform at least one of (i) updating the three-dimensional model, (ii) determining a position of the headset at the particular pose, or (iii) determining extrinsic parameters of the first camera and second camera.

In some implementations, the method includes providing an output for display by the headset based on the updated three-dimensional model.

In some implementations, the epipolar error is a result of deformation of the headset causing a difference from a calibration of the headset.

In some implementations, the method includes determining a set of extrinsic parameters for the first camera and the second camera based on the first image and second image.

In some implementations, the extrinsic parameters include a translation and rotation that together indicate a relationship of the first camera or the second camera with respect to a reference position on the headset.

In some implementations, the method includes: receiving images from the first and second cameras at each of a plurality of different poses along a path of movement of the headset; and determining different extrinsic parameters for the first and second cameras for at least some of the different poses using the results of the optimization involving the epipolar error.

In some implementations, the method includes: identifying multiple key points in the three-dimensional model of the environment that are each at least partly represented in the first image and the second image; and jointly optimizing error across each of the multiple key points.

In some implementations, jointly optimizing the error includes minimizing a total error across each of the multiple key points, the total error including a combination of the reprojection error and the epipolar error.

In some implementations, the method includes: receiving, from a headset, second image data for multiple poses of the headset, identifying at least one second key point in the three-dimensional model of the environment at least partly represented in the second image data; performing bundle adjustment for each of the multiple poses by jointly optimizing (i) a reprojection error for the at least one key point based on the second image data and (ii) an epipolar error for the at least one key point based on the second image data; and using results of the bundle adjustment for each of the multiple poses to perform at least one of (i) updating the three-dimensional model, (ii) determining another position of the headset at each of the multiple poses, or (iii) determining other extrinsic parameters of the first camera and second camera at each of the multiple poses.

In some implementations, the method includes: receiving, from a headset, first image data for a first pose of the headset and second image data for a second pose of the headset, where a deformation of the headset occurs between the first pose of the headset and the second pose of the headset; identifying at least one key point in the three-dimensional model of the environment at least partly represented in the first image data and in the second image data; performing the bundle adjustment using the first image data and the second image data by jointly optimizing at least the epipolar error (a) for the at least one key point (b) that represents the deformation of the headset that occurred between the first pose and the second pose of the headset; and using results of the bundle adjustment to perform at least one of (i) updating the three-dimensional model, (ii) determining a first position of the headset at the first pose or a second position of the headset at the second pose, or (iii) determining first extrinsic parameters of the first camera and the second camera at the first pose, or second extrinsic parameters of the first camera and the second camera at the second pose.

In some implementations, the method includes: performing bundle adjustment using the first image and second image by jointly optimizing (i) the reprojection error for the at least one key point based on the first image and the second image, (ii) the epipolar error for the at least one key point based on the first image and the second image, and (iii) an error based on factory calibration data for the headset.

In some implementations, the method includes: updating a series of poses of the headset using the results of the bundle adjustment.

In some implementations, using the results of the bundle adjustment comprises updating the three-dimensional model including updating positions of one or more key points in the three-dimensional model.

In some implementations, using the results of the bundle adjustment comprises determining the position of the particular pose including determining a position of the headset with respect to the three-dimensional model.

In some implementations, the first image and the second image were captured at approximately the same time.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The subject matter described in this specification can be implemented in various embodiments and may result in one or more of the following advantages. In some implementations, the bundle adjustment process described in this document is faster, uses fewer computer resources, e.g., processor cycles or memory or both, or a combination of these, compared to other systems. In some implementations, the camera calibration process described in this document can make adjustments to account for deformation of a device that includes the camera. These adjustments can improve the accuracy of computations performed for the device, e.g., can improve an accuracy of a three-dimensional model of an environment in which the device is located, a predicted position of the device within the environment, extrinsic parameters for cameras included in the device, or a combination of these.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
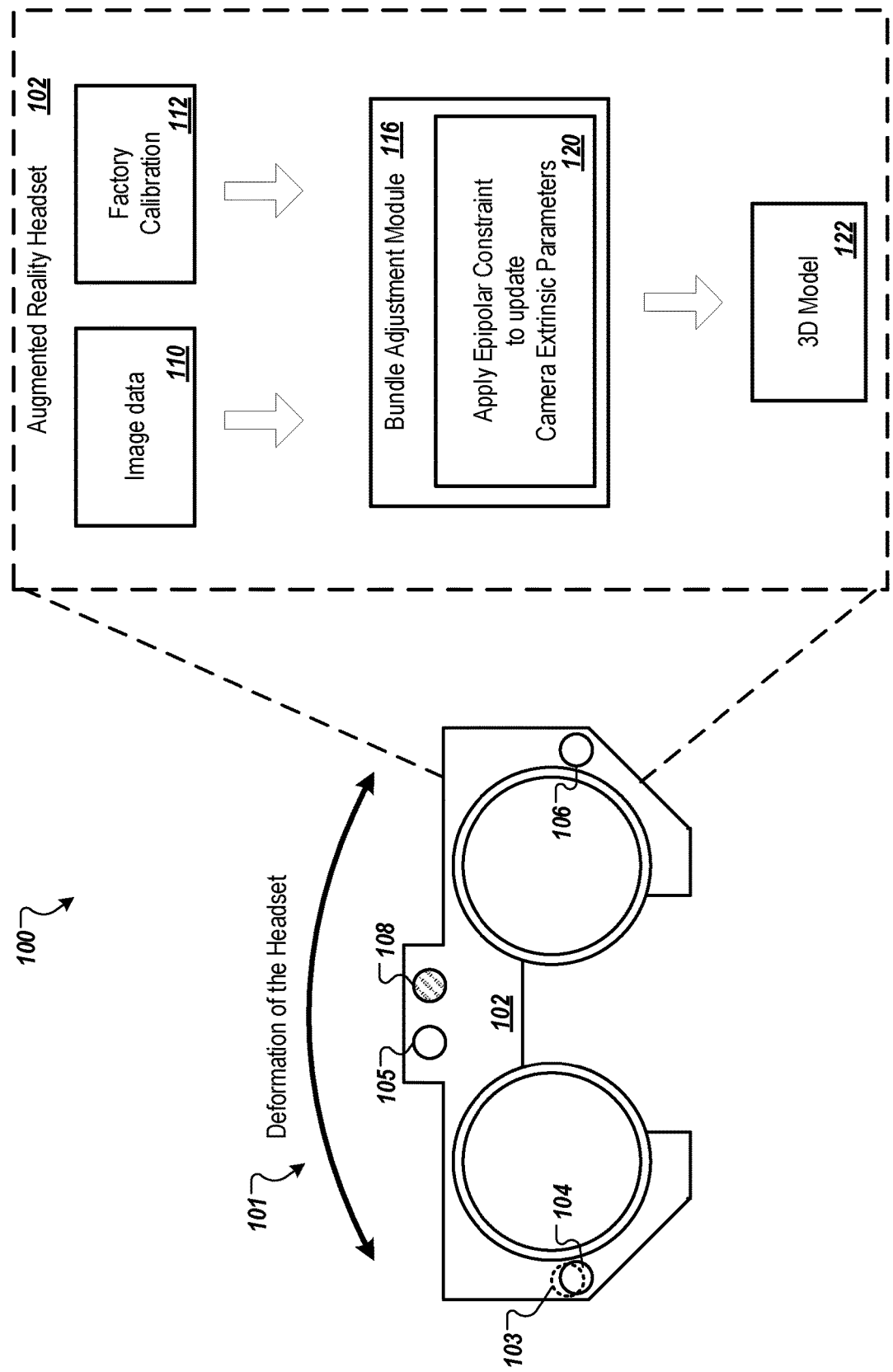
FIG. 1 depicts an example system in which a device updates a model of an environment using bundle adjustment with epipolar constraints.

FIG. 1 depicts an example system 100 in which a device updates a model of an environment using bundle adjustment with epipolar constraints. Although FIG. 1 is described with reference to an augmented reality headset 102 as the device, any other appropriate computer vision system can be used instead of, or in addition to, an augmented reality headset 102. For instance, the augmented reality headset 102 can be any other appropriate type of extended reality headset, such as a mixed reality headset.

The augmented reality headset 102, or another device, can use bundle adjustment to update various data, including a three-dimensional ("3D") model 122 of a physical environment in which the augmented reality headset 102 is located, extrinsic parameters of cameras of the augmented reality headset 102, an estimated position of the augmented reality headset 102 in the physical environment, or any combination of these. By performing the bundle adjustment, the augmented reality headset 102 can determine a more accurate 3D model 122, more accurate extrinsic parameters, a more accurate estimated device position, or any combination of these.

Bundle adjustment is a process for using a set of images from different viewpoints to simultaneously refine a 3D model of environment, poses of the cameras that captured the images, and/or extrinsic parameters of the cameras. In bundle adjustment, errors are minimized between the cameras, such as reprojection error.

The augmented reality headset 102 can repeat the process of generating the updated extrinsic parameters based on received camera data for multiple physical locations, or poses, of the augmented reality headset 102. For example, as the augmented reality headset 102 moves through the physical environment along a path, the headset 102 can generate updated extrinsic parameters, updates to the 3D model 122, an updated estimated device position, or a combination of these, for the multiple positions along the path.

The augmented reality headset 102 includes a right camera 104 and a left camera 106. The augmented reality headset 102 can optionally include a center camera 105, a depth sensor 108, or both. As the augmented reality headset 102 moves through the physical environment, the augmented reality headset 102 receives image data 110 captured by the cameras 104, 106. For example, when the augmented reality headset 102 is at a particular physical location, or pose, in the physical environment, the cameras 104, 106 can capture particular image data 110 for the particular physical location. The image data 110 can be any appropriate image data, such as a first image captured by a camera 104 and a second image captured by the camera 106, or other data that represents an image captured by a respective camera. In some implementations, the image data 110 is for an image in a sequence of video images. For instance, the image data 110 can be for a frame in a video sequence.

In FIG. 1, a deformation 101 occurs in the headset 102. The deformation 101 may occur, for example, when the headset 102 moves from a first pose to a second pose. In some examples, motion of the headset 102 from the first pose to the second pose may cause the deformation 101. In some examples, computational drifts, e.g., based on rounding errors, can occur over time and cause the deformation 101. The deformation may cause a difference in camera parameters from a calibration of the headset. For example, a result of the deformation is that over time calibration parameters for the headset no longer represent the actual calibration of the headset.

The deformation 101 can cause a change in relative position between the camera 104 and a reference position on the headset 102. The reference position may be, for example, the right camera 104, the center camera 105, the left camera 106, or the depth sensor 108. At a first pose, the camera 104 may be positioned at a first position 103, represented in FIG. 1 by a dashed circular line. When the augmented reality headset 102 moves to the second pose, the camera 104 may move to a second position, represented by a solid circular line. Thus, movement of the augmented reality headset 102 causes deformation 101 of the headset 102, whether a physical deformation 101 or a computational drift deformation. This deformation can result in a change in relative position between the camera 104 and the reference position, e.g., the camera 106.

The augmented reality headset 102 can be a system implemented as computer programs on one or more computers in one or more locations, in which the systems, components, and techniques described in this document are implemented. In some implementations, one or more of the components described with reference to the augmented reality headset 102 can be included in a separate system, such as on a server that communicates with the augmented reality headset 102 using a network. The network (not shown), can be a local area network ("LAN"), wide area network ("WAN"), the Internet, or a combination thereof. The separate system may use a single server computer or multiple server computers operating in conjunction with one another, including, for example, a set of remote computers deployed as a cloud computing service.

The augmented reality headset 102 can include several different functional components, including bundle adjustment module 116. The bundle adjustment module 116 can include one or more data processing apparatuses. For instance, the bundle adjustment module 116 can include one or more data processors and instructions that cause the one or more data processors to perform the operations discussed herein.

The various functional components of the augmented reality headset 102 may be installed on one or more computers as separate functional components or as different modules of a same functional component. For example, the bundle adjustment module 116 can be implemented as computer programs installed on one or more computers in one or more locations that are coupled together through a network. In cloud-based systems for example, these components can be implemented by individual computing nodes of a distributed computing system.

The cameras 104, 106 of the headset 102 capture image data 110. The image data 110 and factory calibration data 112, e.g., coarse-grained extrinsic parameters, are input into the bundle adjustment module 116. The bundle adjustment module 116 performs bundle adjustment to jointly minimize error of the headset 102 across multiple key points. The bundle adjustment module 116 applies epipolar constraints to update camera extrinsic parameters 120. The bundle adjustment module 116 can also generate updates to the 3D model 122, to the estimated position of the headset 102, or both. The bundle adjustment module 116 can output an updated 3D model 122. The updated 3D model, or a portion of the updated 3D model, can be presented on a display of the headset 102.

The bundle adjustment module 116 can perform bundle adjustment, e.g., in response to receipt of data or a change in the headset, or at a predetermined interval, e.g., in time, physical distance, or frames. For example, the bundle adjustment module 116 may perform bundle adjustment on every image frame of a video, every other image frame, every third image frame, every tenth frame, etc. In some examples, the bundle adjustment module 116 can perform bundle adjustment based on receiving image data 110 for multiple poses. In some examples, the bundle adjustment module 116 can perform bundle adjustment based on movement of the headset 102 over a threshold distance. In some examples, the bundle adjustment module 116 can perform bundle adjustment based on a change of position of the headset from one area of the environment to another area of the environment. For example, the bundle adjustment module 116 may perform bundle adjustment when the headset 102 moves from one room of a physical location to another room of the physical location. The headset 102 can determine an amount of movement based on, e.g., applying SLAM techniques to determine positions of the headset 102 within the environment.

In some examples, the bundle adjustment module 116 can perform bundle adjustment in response to detection of an error. For example, the headset 102 may detect a deformation error between the cameras 104, 106. In response to the headset 102 detecting a deformation error greater than a designated threshold, the bundle adjustment module 116 can perform bundle adjustment.

Figure 2:
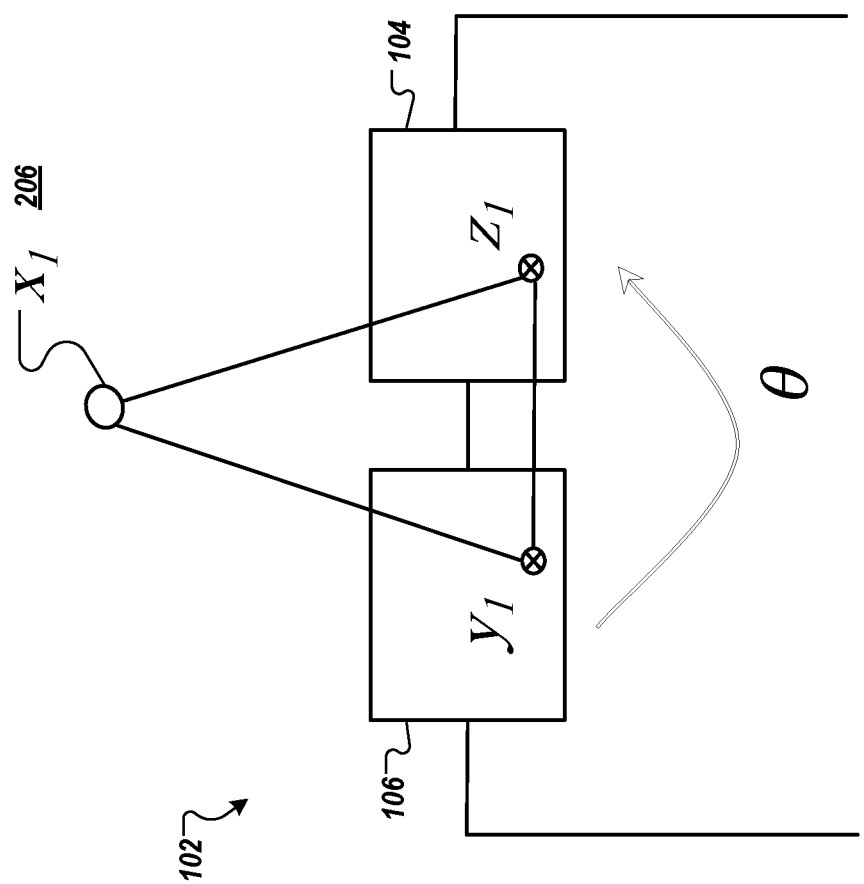
FIG. 2 depicts an example of projection of a key point on an augmented reality device.

FIG. 2 depicts an example of projection of a key point on an augmented reality headset 102. The headset 102 includes right camera 104 and left camera 106. Image planes of the cameras 104, 106 are illustrated as rectangles in FIG. 2. The cameras 104, 106 each capture an image of an environment that depicts key point $x_1$. The camera 104, 106 may capture images of the environment at the same time or at approximately the same time. Although illustrated in FIG. 2 as having only two cameras, in some implementations the headset can include additional cameras.

Key point $x_1$ 206 represents a point in the environment. For example, the key point $x_1$ 206 may represent a point on an edge of a piece of furniture, or a point at a corner of a doorway. The key point $x_1$ 206 can be the coordinates, or any geometric properties, of the corresponding two-dimensional ("2D") observations, visual descriptors of the key points.

A system can project a representation of the key point $x_1$ 206 onto the cameras 104, 106, e.g., the image planes for the cameras as represented in a 3D model. The key point $x_1$ 206 projects onto point $y_1$ of the left camera 106, and onto point $z_1$ of the right camera 104. The points $y_1$ and $z_2$ can each represent a pixel of the respective cameras.

Extrinsic parameters θ are camera parameters that are external to the camera and may change with respect to a reference point, e.g. another camera. The extrinsic parameters θ define a location and orientation of the camera with respect to the reference point. The extrinsic parameters θ in FIG. 2 indicate positional transformation between the cameras 104, 106, e.g., when one of the cameras 104, 106 is the reference point. For example, the extrinsic parameters can indicate translational and rotational relationships between the camera 104 and the camera 106.

The headset 102 can capture images from the cameras 104, 106 at different poses along a path of movement of the headset. In some examples, the device can receive first image data from the cameras 104, 106 for a first pose of the headset and second image data for a second pose of the headset. A deformation may occur between the first pose of the headset and the second pose of the headset. An example is described with reference to FIG. 3.

Figure 3:
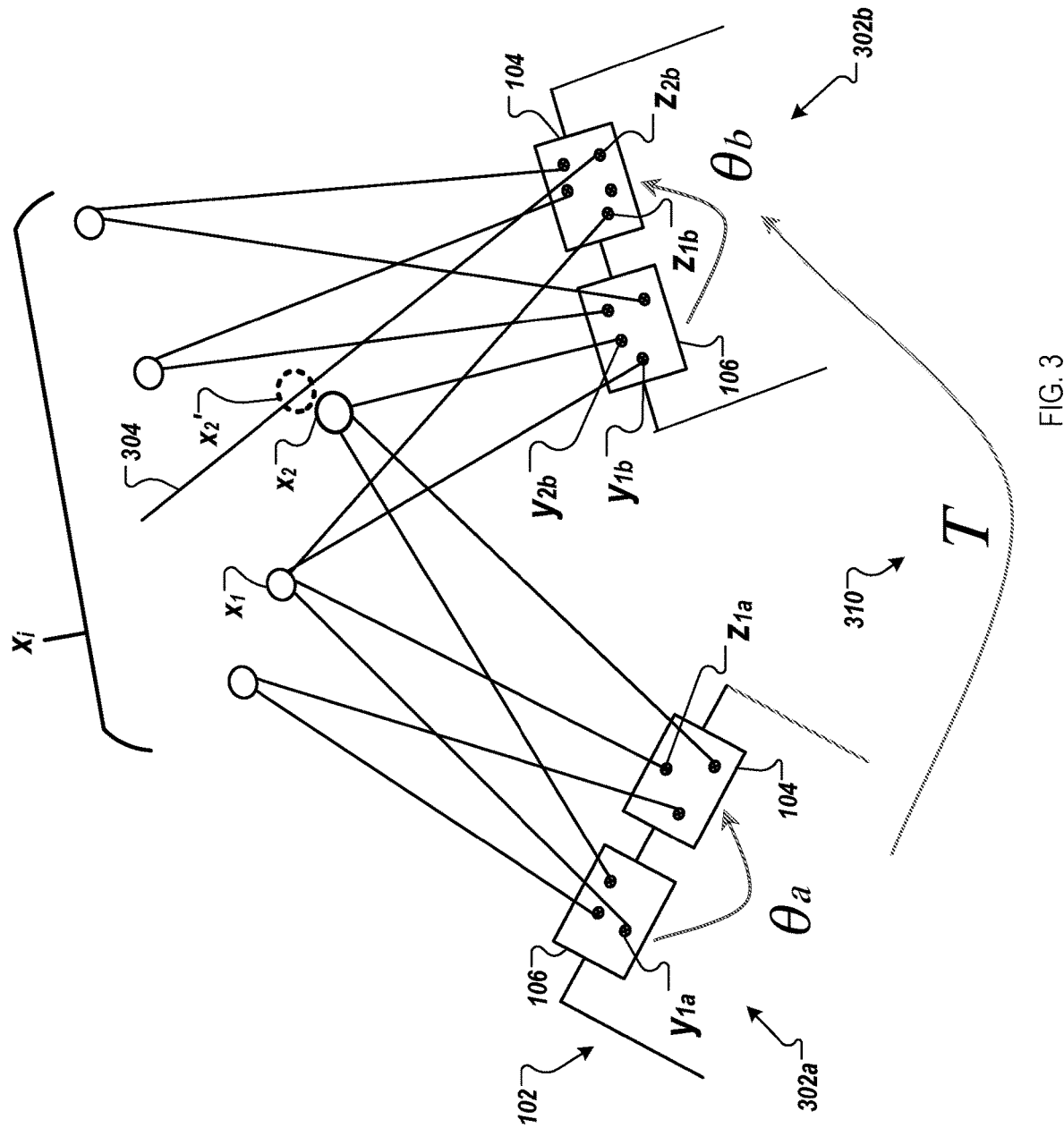
FIG. 3 depicts an example of tracked poses of an augmented reality device.

FIG. 3 depicts an example of tracked poses 302a-b of the augmented reality headset 102. In the example of FIG. 3, the augmented reality headset 102 moves from a first pose 302a to a second pose 302b. At the first pose 302a, the headset 102 has extrinsic parameters $θ_a$. At second pose 302b, the headset 102 has extrinsic parameters $θ_b$. The difference between $θ_a$ and $θ_b$ indicates deformation of the headset 102. Deformation may be caused by movement of the headset 102 from the first pose 302a to the second pose 320b, computational drifts, or other types of deformation, whether physical or computational.

At the first pose 302a, the headset 102 has extrinsic parameters $θ_a$. The right camera 104 and the left camera 106 each capture an image of an environment including key points $x_i$, where i represents an index number of each key point. The key points $x_i$ include the key point $x_1$. A representation of the key point $x_1$ projects onto the cameras 104, 106, at the first pose 302a. The key point $x_1$ projects onto point $y_{1a}$ of the left camera 106, and onto point $z_{1a}$ of the right camera 104.

The headset 102 moves from the first pose 302a to the second pose 302b represented by the translation T. The translation T can include translational movement, rotational movement, or both, of the headset 102. For example, a user wearing the headset may move to a different location, may rotate the headset up or down, and may tilt or rotate the headset between the first pose 302a and the second pose 302b. This movement of the headset 102 is represented by the translation T.

At the second pose 302b, the headset 102 has extrinsic parameters $θ_b$. Differences, or deformation, between $θ_a$ and $θ_b$ may be caused by the translation T. At the second pose 302b, the right camera 104 and the left camera 106 capture an image of the environment including at least some of the key points $x_i$, including the key point $x_1$. The key point $x_1$ projects onto point $y_{1b}$ of the left camera 106, and onto point $z_{1b}$ of the right camera 104.

For a point to be used in calibrating two cameras, such as the camera 104 and the camera 106, the point should be within the field of view of both cameras. For example, a point in the field of view of camera 104 may fall along a line in a field of view of camera 106. The line can be considered the epipolar line of the point. The distance between the epipolar line in the field of view of camera 106 and its corresponding point in that the field of view of camera 104 is the epipolar error.

An epipolar constraint, such as the epipolar error, can be applied to bundle adjustment based on the image plane points y, z and the extrinsic parameters θ for the poses 302a and 302b. An epipolar constraint can be used to represent transformation between two cameras capturing a same projected point. In this way, observations of shared points can be used to correct for extrinsic parameters θ of cameras.

As an example, key point $x_2$ projects onto point $y_{2b}$ of the left camera 106 at pose 302b. The key point $x_2$ projects from a position $x_2'$ and onto point $z_{2b}$ of the right camera 104 at pose 302b. The key point $x_2'$ in the field of view of camera 104 falls along a line 304 from the point $z_{2b}$, e.g., to the key point $x_2'$. The epipolar error can be determined from the distance between the line 304 and the key point $x_2$, which is the actual location for the key point $x_2'$.

An epipolar error $e_i$ can be defined for each key point having an index i, as shown in Equation 1, below.

$$e_i = y_i E z_i \quad (1)$$

In Equation 1, $y_i$ represents the projection of key point having an index i on a first camera, and $z_i$ represents the projection of key point having an index i on a second camera. The symbol E represents an essential matrix composed of extrinsic parameters. The essential matrix E can be defined by Equation 2, below.

$$E = \hat{T}R \quad (2)$$

In Equation 2, the symbol $\hat{T}$ represents a translational matrix between a first pose and a second pose. The symbol R represents a rotational matrix between the first pose and the second pose. When the extrinsic parameters are accurate, the epipolar error $e_i$ is zero. For example, extrinsic parameters are accurate when calibrated extrinsic parameters of the headset indicate the actual relationships among the physical components of the headset. When the epipolar error $e_i$ is zero, Equation 3, below, holds true.

$$e_i = y_i \hat{T} R z_i = 0 \quad (3)$$

Each key point z may project to points $y_{ia}$, $z_{ia}$, at pose 302a, and to points $y_{ib}$, $z_{ib}$ at pose 302b. During bundle adjustment, the epipolar error for each key point z can be used as a constraint in order to refine the poses, the calibrated extrinsic parameters, the 3D model of the environment, or a combination of two or more of these. The bundle adjustment can be used to minimize total error for the set of projected points $x_i$ and observed pixels $y_i$, $z_i$. An example process for performing bundle adjustment using the epipolar constraint is described with reference to FIG. 4.

Figure 4:
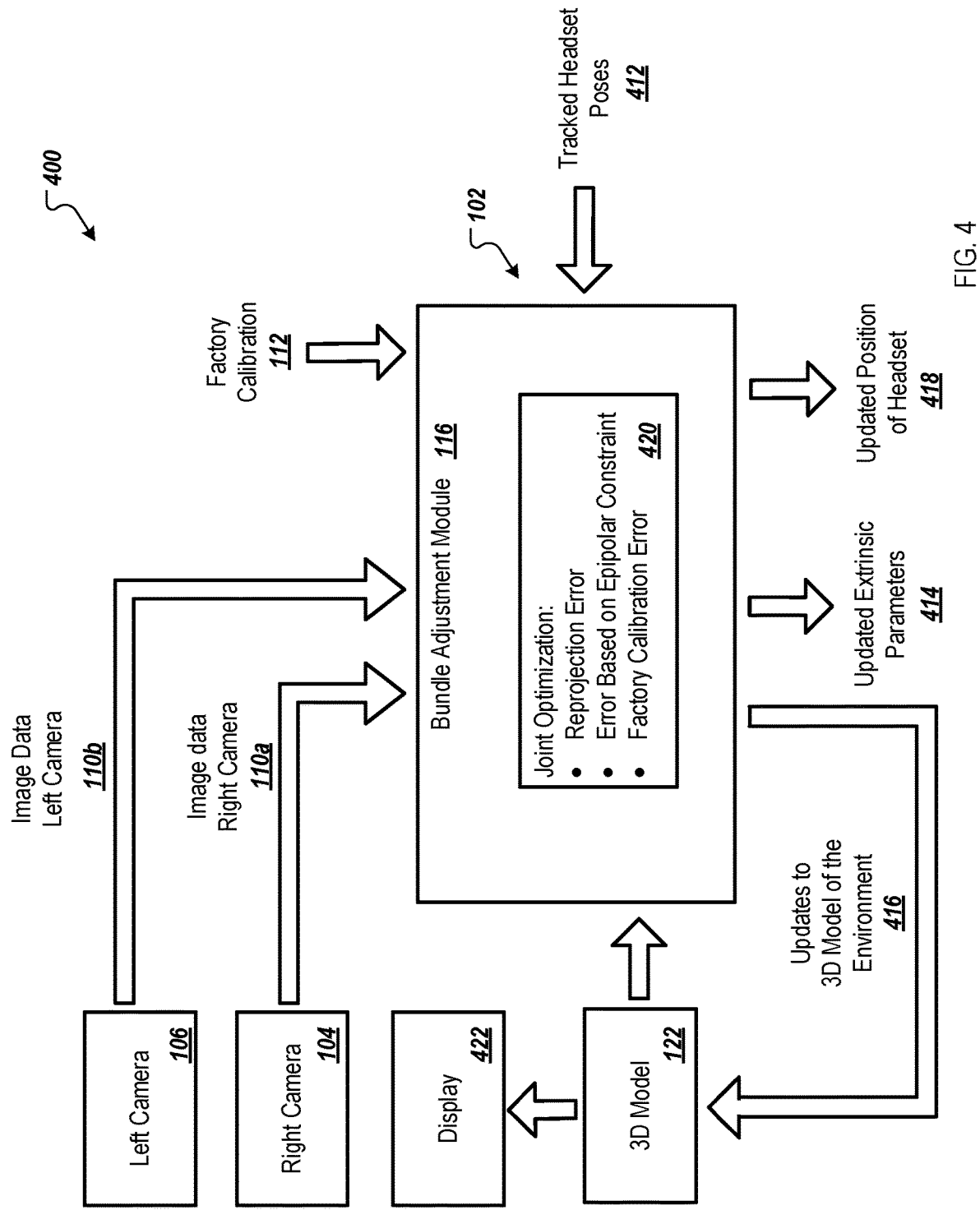
FIG. 4 depicts an example system for performing bundle adjustment using epipolar constraints.

FIG. 4 depicts an example system 400 for performing bundle adjustment using epipolar constraints. In the system 400, the headset 102 performs bundle adjustment using the bundle adjustment module 116. In some implementations, another device or combination of devices can perform bundle adjustment using the bundle adjustment module 116.

In the system 400, the right camera 104 and the left camera 106 capture images of the environment. The right camera 104 outputs image data 110a to the bundle adjustment module 116. The left camera 104 outputs image data 110b to the bundle adjustment module 116. The image data 110a and the image data 110b can be image data representing images of an environment captured at approximately the same time. The bundle adjustment module 116 receives the image data 110a, 110b as input. The bundle adjustment module can also receive, as input, the 3D model 122 of the environment.

The bundle adjustment module 116 can determine a reprojection error based on the image data 110a, 110b and the 3D model 122. Reprojection error $r_i$ can be represented by Equation 4, below.

$$r_i = \Pi(\theta T(x_i)) - z_i \quad (4)$$

In equation 4, $r_i$ represents the reprojection error for 3D point $x_i$. The term $\Pi(\theta T(x_i))$ represents the expected projection of the 3D point $x_i$, based on the 3D model 122. The term $z_i$ represents the actual projection of the 3D point $x_i$.

In some implementations, the system 400 can use one or more of equations (1), (3), or (4) with values from a different camera, e.g., when $x_i$ represents a value for a point depicted in an image captured by a right camera and $y_i$ represents a value for a point depicted in an image captured by a left camera. For instance, a system can use one or more of these equations with values of $y_i$ replaced with values of $x_i$. In some examples, a system can use one or more of these equations with values of $x_i$ replaced with values of $y_i$.

In some implementations, the system 400 can use a different equation to determine a corresponding value for a different camera. For instance, the system can use the reprojection error $r_i$ to determine the reprojection error for a right camera and can use Equation 5, below, to determine the reprojection error $r_{yi}$ for a left camera for an index i.

$$r_{yi} = \|\Pi(x_i) - y_i\|^2 \quad (5)$$

In Equation 5, $\Pi(x_i)$ represents a projection of 3D point $x_i$ having an index i on the right camera. $y_i$ represents the 2D observation in the left image of the projected 3d point $x_i$.

In some implementations, the system 400 can determine the reprojection error for both cameras. For instance, the system 400 can determine the reprojection error $r_i$ for a first camera, e.g., a right camera, and the reprojection error $r_{yi}$ for a second, different camera, e.g., a left camera.

Reprojection error can provide a measure of accuracy by quantifying how closely an estimate of a 3D model point recreates the point's true projection in the environment. A reprojection error is the distance between a projection of a key point detected in the 3D model 122, and a corresponding projection of the key point in the real-world environment projected onto the same image.

In addition to the image data 110a, 110b, the bundle adjustment module 116 can receive, as input, factory calibration data 112. Factory calibration data 112 can include coarse-grained extrinsic parameters for the right camera 104 and the left camera 106.

The coarse-grained extrinsic parameters for a camera can indicate an initial translation and a rotation between the particular camera and a reference position. The reference position can be, for example, a reference position on the headset 102. The reference position can be a reference sensor, such as a reference camera or a reference depth sensor, or another appropriate reference position on the headset 102. A data term u for the factory calibration data can be represented by Equation 6, below.

$$u = \log(\theta_0^{-1}\theta) \quad (6)$$

In equation 4, $\theta_0$ represents the factory calibration extrinsic parameters of a camera. The symbol $\theta$ represents computed extrinsic parameters of the camera.

The bundle adjustment module 116 can also receive, as input, tracked headset poses 412. The tracked headset poses 412 can be, for example, an estimated position of the first pose 302a and the second pose 302b in the environment. The tracked headset poses can include a number of poses along a path of movement of the headset.

The bundle adjustment module 116 can use the image data 110a, 110b, the factory calibration data 112, and the tracked headset poses 412 as input into the bundle adjustment process. In the bundle adjustment process, the bundle adjustment module 116 can perform joint optimization 420 of multiple potential sources of error, based on the received input. Specifically, the bundle adjustment module can perform joint optimization of the reprojection error, the error based on the epipolar constraint, e.g., epipolar error, and the factory calibration error. The joint optimization of these three sources of error to determine a total error $e(T, X, \theta)$ can be represented by Equation 7, below.

$$e(T,X,\theta) = \Sigma_i \|r_i^T \Omega_r r_i\|_h + \Sigma_i \|u_i^T \Omega_u u^i\|_c + \Sigma_i \|e_i^T \Omega_e e_i\|_c \quad (7)$$

Each summation in Equation 7 represents a source of error summed over a set of i key points. Specifically, the first summation represents reprojection error, the second summation represents factory calibration error, and the third summation represents epipolar error. Joint optimization can be performed by minimizing the combined error $e(T,X,\theta)$ across multiple key points.

By including one or more epipolar constraints in the joint optimization, the system can improve accuracy of the error calculation. An epipolar constraint term can rely on raw observations of pixel projections from key points to correct for deformation of the headset 102. Thus, the epipolar constraint term can augment the bundle adjustment module by minimizing a source of error that otherwise would not be considered, be ignored, or both.

The combined error $e(T,X,\theta)$ can be optimized, e.g., minimized, by inserting estimates for rotation R and translation T and obtaining the output of Equation 7. The bundle adjustment module 116 can select the rotational and translational matrices that result in the smallest combined error as the optimized rotation and translation for all key points. In other words, a goal of bundle adjustment is to find values of the rotation R and the translation T that minimize error across all translation matrices and rotation matrices for the key points in the set of key points.

Upon optimizing the error, the bundle adjustment module 116 can use the optimized rotational and translational matrices to update values, parameters, or both, for the headset 102. For example, bundle adjustment module 116 can output updates to the 3D model of the environment 416, update calibrated extrinsic parameters 414, output updates to a position of the headset 418, e.g., in the environment, or any combination of these.

For instance, the bundle adjustment module 116 can apply the updates to the 3D model of the environment 416 to the 3D model 122. Updating the 3D model can include updating positions of one or more key points in the 3D model. The updated 3D model, or a portion of the updated 3D model, can then be presented on a display 422 of the headset 102.

The bundle adjustment module 116 can also update the position of a particular pose of the headset 102. Updating the position of the headset 102 can include determining a position of the headset 102 with respect to the 3D model 122. In some examples, the bundle adjustment module 116 can update series or paths of poses of the headset 102 based on the bundle adjustment.

The bundle adjustment module 116 can update extrinsic parameters for the right camera 104, the left camera 106, or both. The bundle adjustment module 116 may determine different extrinsic parameters for each camera. The bundle adjustment module 116 can output, or otherwise use, the extrinsic parameters for multiple different poses.

The updated parameters, e.g., updated extrinsic parameters 414, determined by the bundle adjustment module 116 can be applied to future image data captured by the cameras 104, 106. For example, the updated extrinsic parameters can be provided to a SLAM system for future use in determining position of the headset 102 in the environment. In some examples, updated extrinsic parameters 414 may be used to override current extrinsic parameters of the headset 102. The updated extrinsic parameters 414 can be specific for each position, or pose, of the headset 102.

With updated extrinsic parameters 414, accuracy can be improved for the 3D model, the headset poses, or both. Due to the bundle adjustment using the epipolar constraint, updated extrinsic parameters can be optimized across all key points for each pose of the headset 102. Thus, minimizing the epipolar constraint during the optimization process along the bundle adjustment problem can result in a higher accuracy online calibration of the headset compared to other systems.

Figure 5:
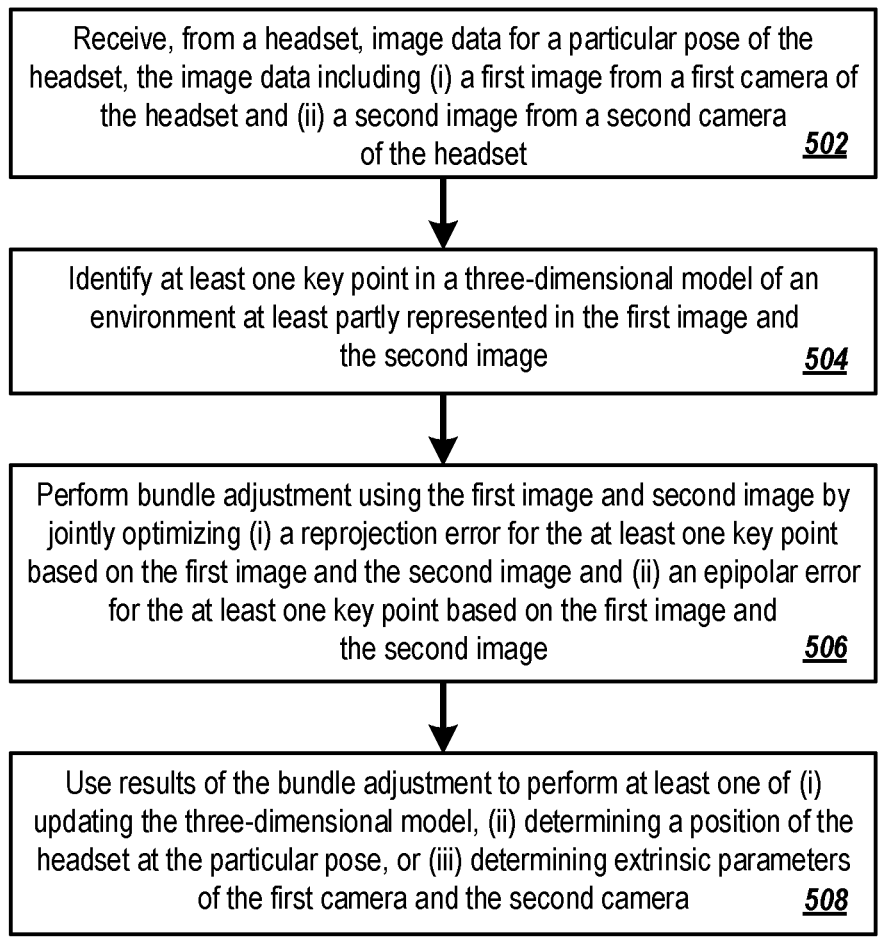
FIG. 5 is a flow diagram of a process for updating a model of an environment using bundle adjustment with epipolar constraints.

FIG. 5 is a flow diagram of a process 500 for performing bundle adjustment using epipolar constraints. For example, the process 500 can be used by a device such as the augmented reality headset 102 from the system 100.

A device receives, from a headset, image data for a particular pose of the headset, the image data including (i) a first image from a first camera of the headset and (ii) a second image from a second camera of the headset (502). In some examples, the device can receive images from the first and second cameras at each of a plurality of different poses along a path of movement of the headset. In some examples, the device can receive first image data from a headset for a first pose of the headset and second image data for a second pose of the headset. A deformation may occur between the first pose of the headset and the second pose of the headset.

The device can receive the image data from one or more cameras. The one or more cameras can be integrated into the device or another device. In some examples, the device can receive a first portion of the image data from a first camera and a second, different portion of the image data from a second, different camera. The first image and the second image can be captured by the first camera and the second camera, respectively, at the same time or approximately the same time. This can enable synchronization of the first image and the second image. In some implementations, the second image can be captured within a threshold time period from the capture of the first image.

The device identifies at least one key point in a three-dimensional model of an environment at least partly represented in the first image and the second image (504). In some examples, the device can identify multiple key points. The device can identify the at least one key point by receiving data that indicates the at least one key point, e.g., received from another device or system. The device can identify the at least one key point by performing one or more computations to identify the key point. For instance, the device can analyze an image, or multiple images, and determine a point depicted in the image or each of the multiple images. The image can be the first image or the second image. The multiple images can include the first image and the second image.

The device performs bundle adjustment using the first image and second image by jointly optimizing (i) a reprojection error for the at least one key point based on the first image and the second image and (ii) an epipolar error for the at least one key point based on the first image and the second image (506). In some examples, the epipolar error represents deformation of the headset causing a difference from a calibration of the headset.

In some examples, the device can identify multiple key points and jointly optimize error across each of the multiple key points. Jointly optimizing the error across the multiple key points can include minimizing a total error across each of the multiple key points. The total error can include a combination of the reprojection error and the epipolar error for two or more of the multiple key points. The total error can include factory calibration error.

In some examples, the device can perform bundle adjustment using the first image and second image by jointly optimizing (i) a reprojection error for the at least one key point based on the first image and the second image, (ii) an epipolar error for the at least one key point based on the first image and the second image, and (iii) an error based on factory calibration of the headset.

The device uses results of the bundle adjustment to perform at least one of (i) updating the three-dimensional model, (ii) determining a position of the headset at the particular pose, or (iii) determining extrinsic parameters of the first camera and the second camera (508). Determining the position of the particular pose can include determining a position of the headset with respect to the three-dimensional model.

In some examples, the device can use the results of the bundle adjustment to update the three-dimensional model, and can provide an output for display by the headset based on the updated three-dimensional model. In some examples, updating the model includes updating positions of one or more key points in the model.

In some examples, the device can determine a set of extrinsic parameters for the particular pose based on the first image and second image. The device can determine different extrinsic parameters for the first and second cameras for at least some of multiple different poses using the optimization involving epipolar error. The device can update series, or paths, of poses of the headset based on the bundle adjustment.

The device can use results of the bundle adjustment to determine a position of the headset at each of the multiple poses, determine extrinsic parameters of the first camera and second camera at each of the multiple poses, or both. For example, the device can determine first extrinsic parameters of the first camera and the second camera at the first pose, and second extrinsic parameters of the first camera and the second camera at the second pose. The first extrinsic parameters may be different from the second extrinsic parameters. In some examples, a difference between the first extrinsic parameters and the second extrinsic parameters can be due to deformation of the headset that occurred between the first pose and the second pose.

In some examples, the extrinsic parameters include a translation and rotation that indicate a relationship of the first camera or the second camera with respect to a reference position on the headset. The reference position can be, for example, another camera different than the camera for which the extrinsic parameters are being determined, a depth sensor, an inertial measurement unit, or another appropriate position on the headset. In some implementations, the extrinsic parameters for each of the cameras are with respect to the same reference position on the headset. In some implementations, the extrinsic parameters for at least some of the cameras are with respect to different references positions on the headset.

The device can provide the updated camera extrinsic parameters for use as input to a simultaneous localization and mapping process that determines an update to an environment model for the environment and an estimated position of the device within the environment.

The order of steps in the process 500 described above is illustrative only, and bundle adjustment can be performed in different orders. In some implementations, the process 500 can include additional steps, fewer steps, or some of the steps can be divided into multiple steps. For instance, the device can receive image data, identify the at least one key point, and perform bundle adjustment without using the result of the bundle adjustment. In these examples, the device can provide the result of the bundle adjustment to another device, e.g., the headset when the device is part of a system of one or more computers that performs bundle adjustment.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A method comprising:
   receiving, from a headset, image data for a particular pose of the headset, the image data comprising (i) a first image from a first camera of the headset and (ii) a second image from a second camera of the headset;
   identifying a set of key points in a three-dimensional model of an environment at least partly represented in the first image and the second image;
   performing bundle adjustment using the first image and second image by jointly optimizing (i) a reprojection error for the key points of the set of key points (ii) an epipolar error for the key points of the set of key points; and (iii) a factory calibration error, wherein the factory calibration error comprises a change in relative position between the first camera and a reference position on the headset, wherein jointly optimizing comprises:
      calculating a total error, wherein calculating the total error comprises summing together:
         a first summation of reprojection errors for the set of key points,
         a second summation of epipolar errors for the set of key points, and
         a third summation of factory calibration errors for the set of key points; and
   using results of the bundle adjustment to perform at least one of (i) updating, as an updated three-dimensional model, the three-dimensional model, (ii) determining a position of the headset at the particular pose, or (iii) determining extrinsic parameters of the first camera and second camera.

2. The method of claim 1, comprising providing an output for display by the headset based on the updated three-dimensional model.

3. The method of claim 1, wherein the epipolar error is a result of deformation of the headset causing a difference from a calibration of the headset.

4. The method of claim 1, comprising determining a set of extrinsic parameters for the first camera and the second camera based on the first image and the second image.

5. The method of claim 1, wherein the extrinsic parameters include a translation and rotation that together indicate a relationship of the first camera or the second camera with respect to a reference position on the headset.

6. The method of claim 1, comprising:
receiving images from the first and second cameras at each of a plurality of different poses along a path of movement of the headset; and
determining different extrinsic parameters for the first and second cameras for at least some of the plurality of different poses using results of the jointly optimizing involving the epipolar error.

7. The method of claim 1, wherein jointly optimizing the error comprises minimizing the total error across each of the multiple key points.

8. The method of claim 1, comprising:
receiving, from the headset, second image data for multiple poses of the headset;
identifying at least one second key point in the three-dimensional model of the environment at least partly represented in the second image data;
performing bundle adjustment for each of the multiple poses by jointly optimizing (i) a reprojection error for the at least one key point based on the second image data and (ii) an epipolar error for the at least one key point based on the second image data; and
using results of the bundle adjustment for each of the multiple poses to perform at least one of (i) updating the three-dimensional model, (ii) determining another position of the headset at each of the multiple poses, or (iii) determining other extrinsic parameters of the first camera and the second camera at each of the multiple poses.

9. The method of claim 1, comprising:
receiving, from the headset, first image data for a first pose of the headset and second image data for a second pose of the headset, wherein a deformation of the headset occurs between the first pose of the headset and the second pose of the headset;
identifying at least one second key point in the three-dimensional model of the environment at least partly represented in the first image data and in the second image data;
performing the bundle adjustment using the first image data and the second image data by jointly optimizing at least the epipolar error (a) for the at least second one key point (b) that represents the deformation of the headset that occurred between the first pose and the second pose of the headset; and
using results of the bundle adjustment to perform at least one of (i) updating the three-dimensional model, (ii) determining a first position of the headset at the first pose or a second position of the headset at the second pose, or (iii) determining first extrinsic parameters of the first camera and the second camera at the first pose, or second extrinsic parameters of the first camera and the second camera at the second pose.

10. The method of claim 1, comprising updating a series of poses of the headset using the results of the bundle adjustment.

11. The method of claim 1, wherein using the results of the bundle adjustment comprises updating the three-dimensional model comprising updating positions of one or more key points in the three-dimensional model.

12. The method of claim 1, wherein using the results of the bundle adjustment comprises determining the position of the headset at the particular pose with respect to the three-dimensional model.

13. The method of claim 1, wherein the first image and the second image were captured at approximately a same time.

14. A non-transitory computer storage medium encoded with instructions that, when executed by one or more computers, cause the one or more computers to perform operations including:
receiving, from a headset, image data for a particular pose of the headset, the image data comprising (i) a first image from a first camera of the headset and (ii) a second image from a second camera of the headset;
identifying a set of key points in a three-dimensional model of an environment at least partly represented in the first image and the second image;
performing bundle adjustment using the first image and second image by jointly optimizing (i) a reprojection error for the key points of the set of key points (ii) an epipolar error for the key points of the set of key points; and (iii) a factory calibration error, wherein the factory calibration error comprises a change in relative position between the first camera and a reference position on the headset, wherein jointly optimizing comprises:
calculating a total error, wherein calculating the total error comprises summing together:
a first summation of reprojection errors for the set of key points,
a second summation of epipolar errors for the set of key points, and
a third summation of factory calibration errors for the set of key points; and
using results of the bundle adjustment to perform at least one of (i) updating, as an updated three-dimensional model, the three-dimensional model, (ii) determining a position of the headset at the particular pose, or (iii) determining extrinsic parameters of the first camera and second camera.

15. The non-transitory computer storage medium of claim 14, comprising providing an output for display by the headset based on the updated three-dimensional model.

16. The non-transitory computer storage medium of claim 14, wherein the epipolar error is a result of deformation of the headset causing a difference from a calibration of the headset.

17. The non-transitory computer storage medium of claim 14, comprising determining a set of extrinsic parameters for the first camera and the second camera based on the first image and the second image.

18. A system comprising one or more computers and one or more storage devices on which are stored instructions that are operable, when executed by the one or more computers, to cause the one or more computers to perform operations including:
receiving, from a headset, image data for a particular pose of the headset, the image data comprising (i) a first image from a first camera of the headset and (ii) a second image from a second camera of the headset;

identifying a set of key points in a three-dimensional model of an environment at least partly represented in the first image and the second image;

performing bundle adjustment using the first image and second image by jointly optimizing (i) a reprojection error for the key points of the set of key points (ii) an epipolar error for the key points of the set of key points; and (iii) a factory calibration error, wherein the factory calibration error comprises a change in relative position between the first camera and a reference position on the headset, wherein jointly optimizing comprises:

calculating a total error, wherein the calculating the total error comprises summing together:
        a first summation of reprojection errors for the set of key points,
        a second summation of epipolar errors for the set of key points, and
        a third summation of factory calibration errors for the set of key points; and using results of the bundle adjustment to perform at least one of (i) updating, as an updated three-dimensional model, the three-dimensional model, (ii) determining a position of the headset at the particular pose, or (iii) determining extrinsic parameters of the first camera and second camera.

\* \* \* \* \*